(12) United States Patent  (10) Patent No.: US 7,957,493 B2
Dalla Torre et al.  (45) Date of Patent: Jun. 7, 2011

(54) CANDIDATE GENERATION

(75) Inventors: Rafi Dalla Torre, Givataim (IL); Doron Burshtein, Ramat-Efal (IL); Oren Peles, Rehovot (IL); Deric W. Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 890 days.

(21) Appl. No.: 11/926,625

(22) Filed: Oct. 29, 2007

(65) Prior Publication Data

US 2008/0137765 A1 Jun. 12, 2008

Related U.S. Application Data

(60) Provisional application No. 60/869,455, filed on Dec. 11, 2006.

(51) Int. Cl.
*H04L 27/06* (2006.01)
(52) U.S. Cl. ......... 375/340; 375/260; 375/267; 375/347
(58) Field of Classification Search .................. 375/260, 375/267, 340, 347
See application file for complete search history.

(56) References Cited

U.S. PATENT DOCUMENTS

| | | | | |
|---|---|---|---|---|
| 5,519,356 | A | * | 5/1996 | Greenberg ................... 329/304 |
| 6,934,317 | B1 | | 8/2005 | Dent |
| 2004/0025107 | A1 | * | 2/2004 | Hessel ........................ 714/796 |
| 2004/0240577 | A1 | * | 12/2004 | Borran et al. ................. 375/267 |
| 2005/0163196 | A1 | | 7/2005 | Currivan et al. |
| 2005/0220220 | A1 | * | 10/2005 | Belotserkovsky ............ 375/316 |

OTHER PUBLICATIONS

Damen, Mohamed Oussama et al., "On Maximum-Likelihood Detection and the Search for the Closest Lattice Point," IEEE Transaction on Information Theory, vol. 49, No. 10, Oct. 2003, pp. 2389-2402.
Hochwald, Bertrand M. et al., "Achieving Near-Capacity on a Multiple-Antenna Channel," IEEE Transactions on Communications, vol. 51, No. 3, Mar. 2003, pp. 389-399.

* cited by examiner

*Primary Examiner* — Curtis B Odom
(74) *Attorney, Agent, or Firm* — Steven A. Shaw; W. James Brady; Frederick J. Telecky, Jr.

(57) ABSTRACT

A method and system for generating a set of candidate symbols. A system includes a Multiple Input Multiple Output ("MIMO") receiver. The receiver includes a candidate generation look-up table ("LUT") that provides a list of candidate values for a transmitted symbol selected from a constellation of symbols. The candidate generation LUT stores candidate lists for a portion of the constellation of symbols. The portion of the constellation for which candidate lists are stored is selected according to a symmetry of the constellation. The LUT preferably provides a secondary constellation superimposed on a decision region of a primary constellation. The LUT also preferably includes an inner point of the primary constellation and outer points of the primary constellation. The primary and secondary constellations are preferably compressed by application of quadrant, mirror, and inner-point symmetries.

19 Claims, 13 Drawing Sheets

CANDIDATE GENERATION

CROSS-REFERENCE TO RELATED APPLICATIONS

The present application claims priority to U.S. provisional patent application Ser. No. 60/869,455, filed Dec. 11, 2006, and entitled "Generating a Set of Candidates from a Constellation" hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas. In response this complexity, a variety of MIMO detection algorithms have been proposed.

Many MIMO detection algorithms, as well as many other communications applications, require finding a set of constellation symbols nearest a given input. This operation is called candidate generation. Candidate generation is employed in a variety of MIMO detectors, including the sphere detector, as described in Bernard M. Hochwald & Stephan ten Brink, *Achieving Near-Capacity on a Multiple-Antenna Channel*, 51 IEEE TRANSACTIONS ON COMMUNICATIONS 389 (2003), which requires ranking of candidates for each symbol. For pulse amplitude modulation ("PAM") constellations, a simple candidate generation algorithm, as described in Mohamed Oussama Damen et al, *On Maximum-Likelihood Detection and the Search for the Closest Lattice Point*, 49 IEEE TRANSACTIONS ON INFORMATION THEORY 2389 (2003), is well-known. For other constellations, however, candidate generation is more difficult.

An ideal candidate generation algorithm computes the set of L symbols in a given alphabet that are nearest a given input in the Euclidean distance sense. Mathematically, the ideal candidate generator computes the set S(y,L):

$$S(y,L)=\{x\,|\,|y-x|<|y-a_L|,x\in A\},$$

where $a_L$ is the L-th nearest symbol to y that belongs to the set A.

A brute-force implementation of the ideal candidate generation algorithm sorts all the elements of A by their distance from y, and then takes the first L elements of the sorted list. When the alphabet is large this is an inefficient implementation.

SUMMARY

A variety of novel look-up table based candidate generation techniques are herein disclosed. The disclosed techniques take advantage of the symmetric properties exhibited by many symbol constellations to provide lossless compression of a candidate generation look-up table ("LUT"). Additionally, a selected secondary constellation may overlay each point of a primary constellation to define the input values stored in the look-up table. Symmetries of the secondary constellation may be exploited to further compress the LUT. In accordance with at least some embodiments, as apparatus includes a Multiple Input Multiple Output ("MIMO") receiver. The receiver includes a candidate generation look-up table that provides a list of candidate values for a transmitted symbol selected from a constellation of symbols. The candidate generation look-up table stores candidate lists for a portion of the constellation of symbols. The portion of the constellation stored is selected according to a symmetry of the constellation of symbols.

In other embodiments, an apparatus includes a MIMO receiver. The MIMO receiver further includes a candidate generation look-up table that provides a list of candidate values for a transmitted symbol selected from a constellation of symbols. The candidate generation look-up table comprises a secondary constellation within a decision region of a primary constellation.

In yet other embodiments, a method includes receiving a signal, the signal includes a symbol selected from a constellation of symbols. The method further includes performing a rotation of the signal to produce a rotated signal and retrieving a set of values from a candidate look-up table. The look-up table contains candidate values for a portion of the constellation of symbols. The portion of the constellation is selected according to a symmetry of the constellation. A list of candidate symbols corresponding to the signal is generated from the set of values retrieved from the candidate look-up table.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for generating a candidate list in a Multiple Input Multiple Output ("MIMO") receiver. The embodiments of the present disclosure apply a Look-Up Table ("LUT") to provide a candidate list for an input symbol. The storage required by the LUT is reduced by taking advantage of the symmetric properties of a symbol constellation. The symmetries allow for lossless compression of the LUT. Moreover, embodiments of the invention may store a candidate list in the LUT for each point of a secondary constellation overlaid on a decision region of a primary constellation.

The input to a candidate generation algorithm may be defined as:

$$y = a + n,$$

where a is a transmitted symbol belonging to, for example, the QAM alphabet A, and n is complex additive noise. The goal of the candidate generation algorithm is to find a set of the L most likely candidates for the symbol a.

Figure 1:
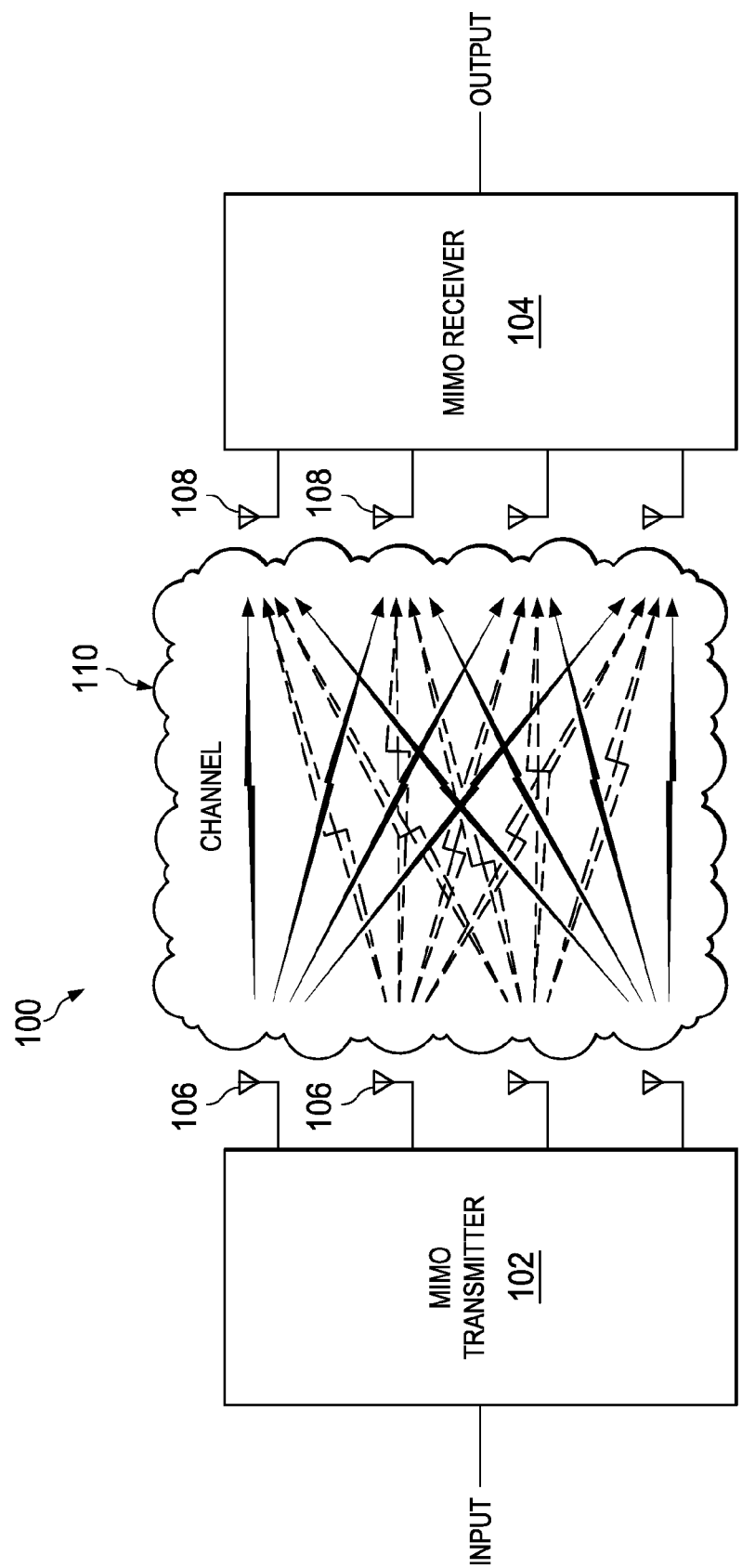
FIG. 1 shows an illustrative Multiple Input Multiple Output ("MIMO") network in accordance with embodiments of the invention.

FIG. 1 shows an illustrative example of a MIMO system in accordance with embodiments of the invention. MIMO transmitter 102 includes one or more antennas 106 for transmitting radio frequency signals. MIMO transmitter 102 may, in general, be a fixed or portable wireless device, a cellular phone, a personal digital assistant, a wireless modem card, or any other device configured to transmit on a MIMO wireless network. MIMO receiver 104 is configured to receive radio frequency signals transmitted by MIMO transmitter 102. MIMO receiver 104 includes one or more antennas 108 for receiving transmitted radio frequency signals.

MIMO transmitter 102 transmits radio frequency signals to MIMO receiver 104 through channel 110. A signal transmitted by transmitter 102 includes a symbol selected from a symbol constellation. The transmitted signal is distorted by noise while traversing channel 110, and by noise induced by the components of transmitter 102 and receiver 104. The receiver 104 attempts to determine which constellation symbol is represented by the received signal. Note that although channel 110 is referenced herein as a wireless channel, more generally it represents any path or media for conveying a signal from transmitter 102 to receiver 104. Accordingly, embodiments of the invention are not limited to wireless communication applications, but rather encompass all applications requiring generation of a list of candidate symbols.

For a symbol constellation of size A and a MIMO transmitter 102 including N transmit antennas, the brute-force implementation of a MIMO detector must compute $A^N$ distances between the received signal vector and each of the $A^N$ candidates for the transmitted signal vector. This computational burden may make the brute force implementation of the detector impractical for MIMO receiver 104. To reduce the detector's computational complexity, the MIMO receiver 104 preferably includes a detector structure that includes a candidate generation LUT for providing a list of candidate symbols as disclosed herein. Embodiments of the present disclosure take advantage of constellation symmetry to reduce LUT storage while maintaining performance.

LUT Candidate Generation ("CG"), is herein disclosed, uses a pre-computed sequence of candidates for different possible values of the input y. Embodiments of the invention define the values of y stored in the LUT by subdividing each constellation point of a primary constellation, for example, a QAM constellation, into miniature or secondary constellations. Considering, for example a QAM primary constellation, around each point in the QAM alphabet A, the points in the secondary alphabet S are added. The resulting constellation is defined as:

$$Q(A,S)=\{a+s | \forall a \in A, \forall s \in S\}.$$

The size of the set $Q(A,S)$ is $|A| \cdot |S|$, where $|S|$ is the cardinality of the alphabet S. The LUT has three dimensions. For example, $LUT(i_a, i_s, k)$ is the k-th element of the sequence corresponding to the index pair $i_a$, $i_s$, where $i_a$ and $i_s$ are indices into the alphabets A and S, respectively.

Figure 2:
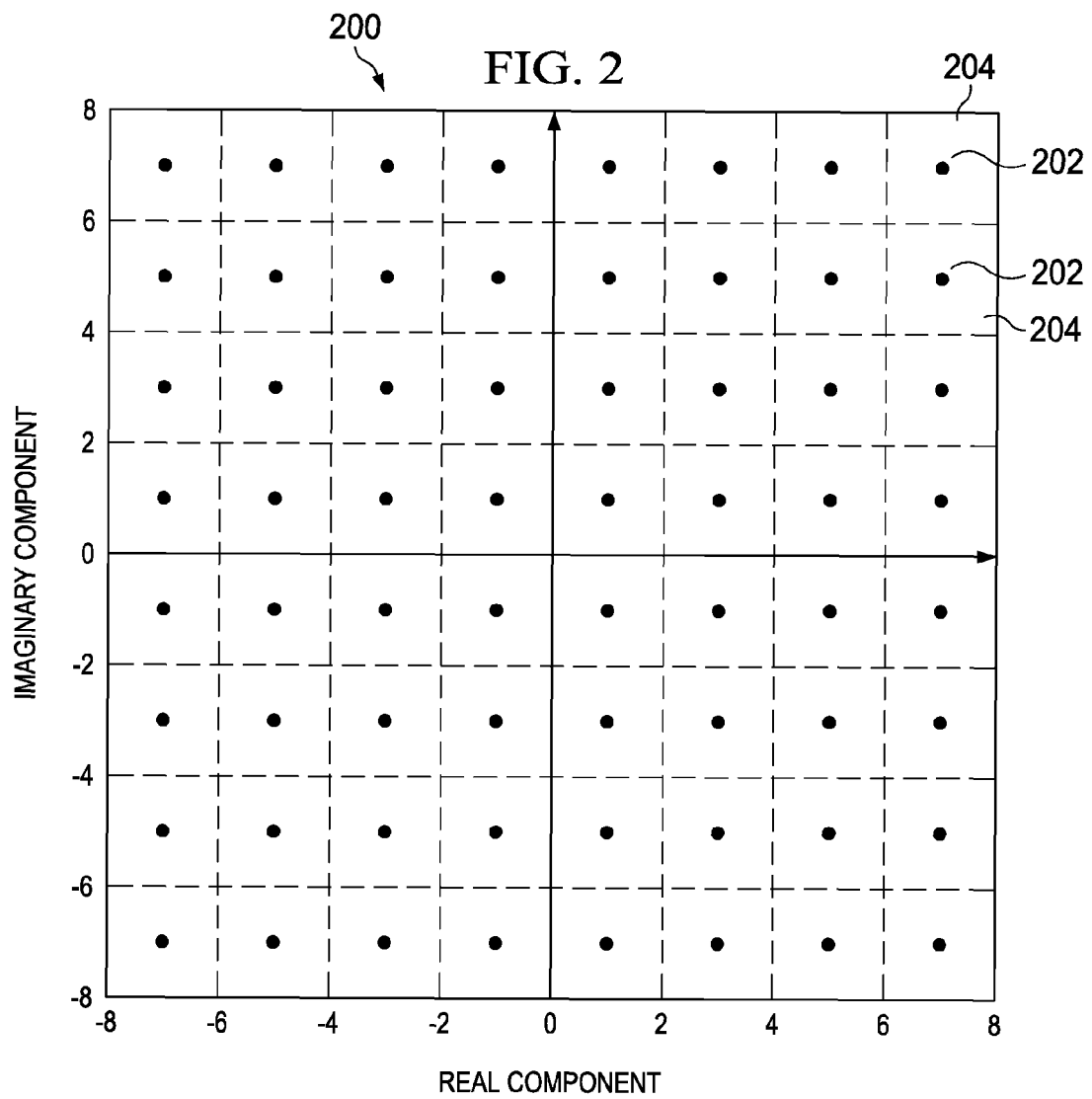
FIG. 2 shows an illustrative 64-QAM constellation in accordance with embodiments of the invention.
Figure 3:
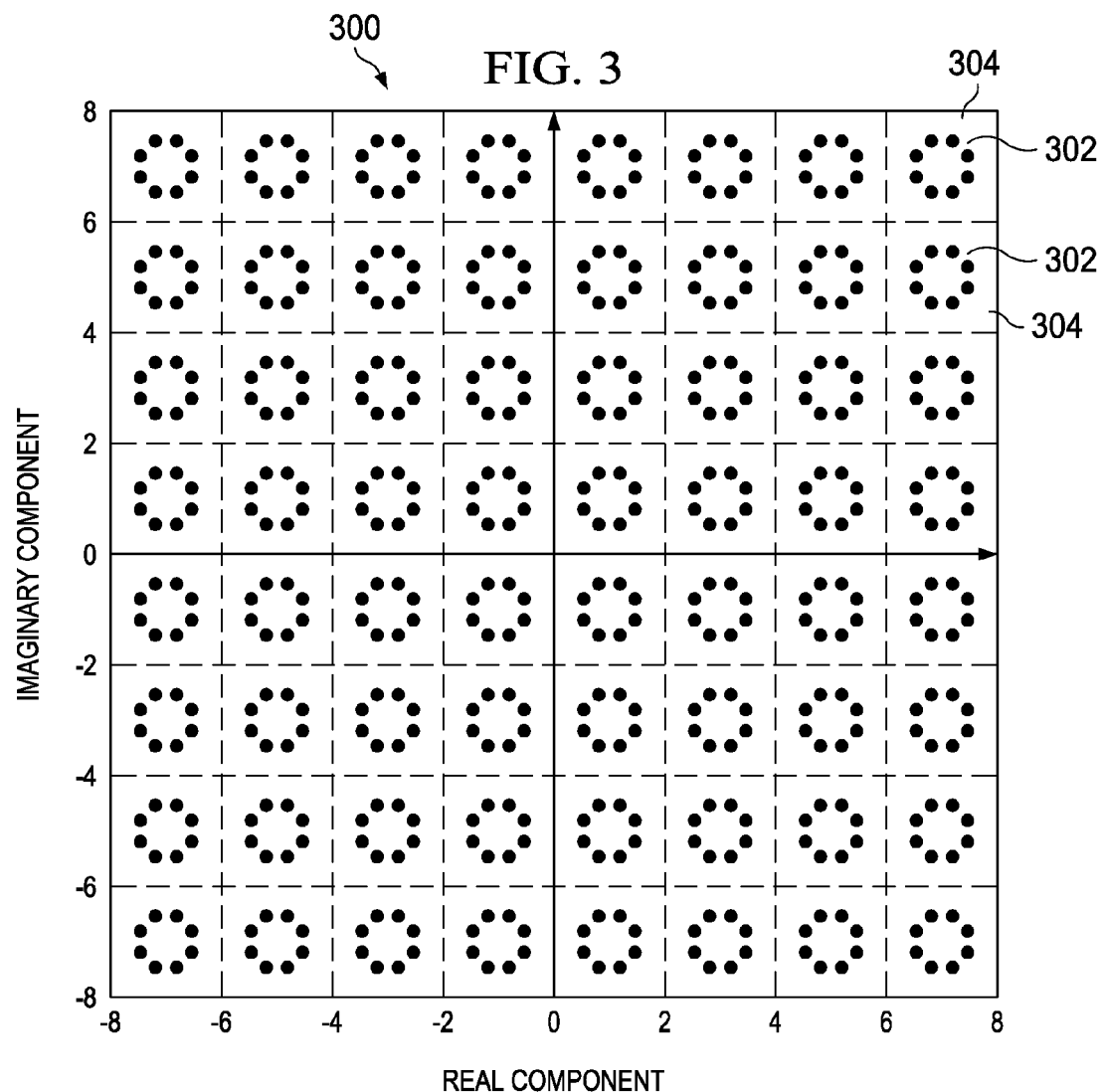
FIG. 3 shows an illustrative 64-QAM primary constellation incorporating an 8-PSK secondary constellation in each decision region in accordance with at least some preferred embodiments of the invention.

Embodiments of the invention are not restricted to any particular set of primary or secondary constellations. Thus, FIG. 2 shows a 64-QAM constellation 200, which is also the constellation Q(A,S) when no secondary constellation is included, i.e. S={0}. Each constellation point 202 is at the center of a square decision region 204. To build the set Q(A, S), each of these decision regions will contain a secondary constellation S. FIG. 3 shows a constellation Q(A,S) where a 64-QAM (A=64-QAM) primary constellation 300 includes an 8-PSK (S=8-PSK) secondary constellation 302 in each square decision region 304.

Figure 4:
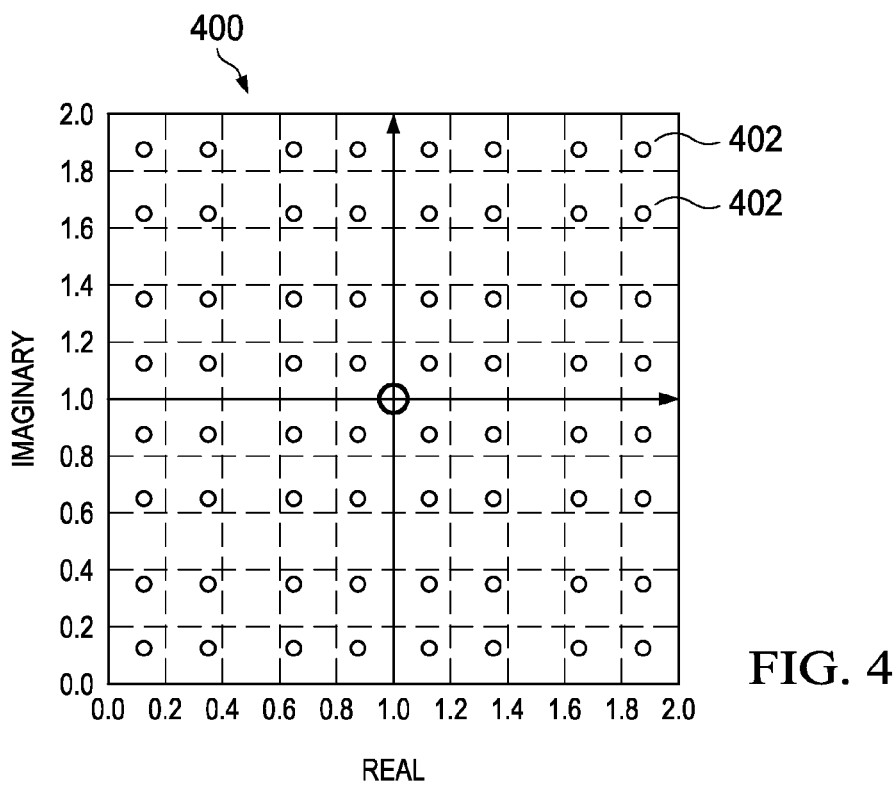
FIG. 4 shows an illustrative division of a primary constellation decision region into 64 quantization points of a 64-QAM secondary constellation in accordance with at least some preferred embodiments of the invention.
Figure 5:
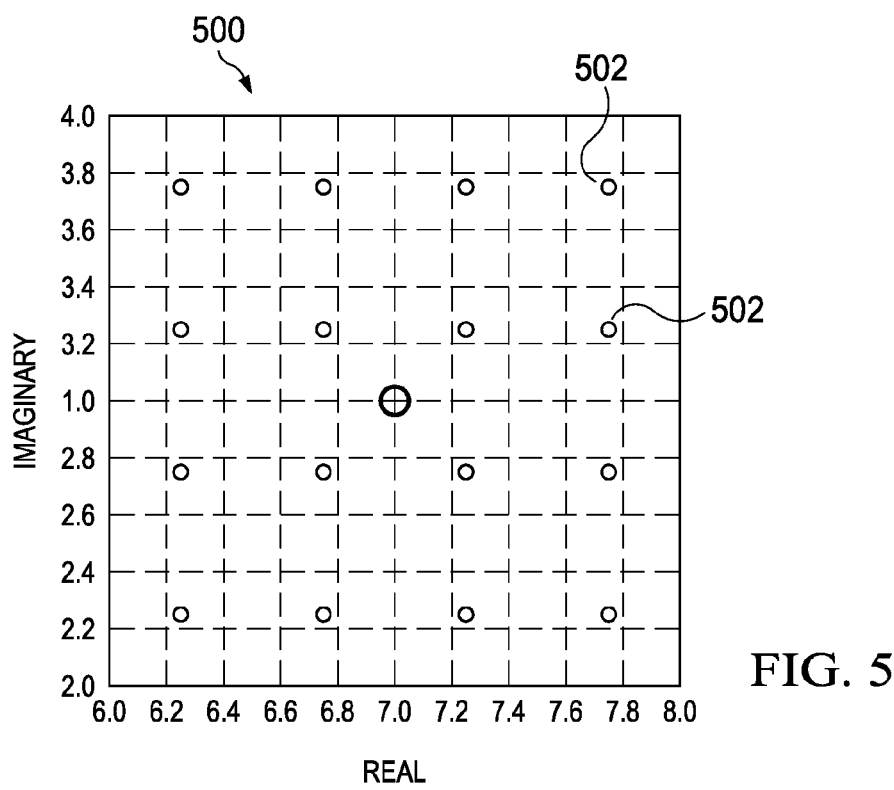
FIG. 5 shows an illustrative division of a primary constellation decision region into 16 quantization points of a 16-QAM secondary constellation in accordance with at least some preferred embodiments of the invention.
Figure 6:
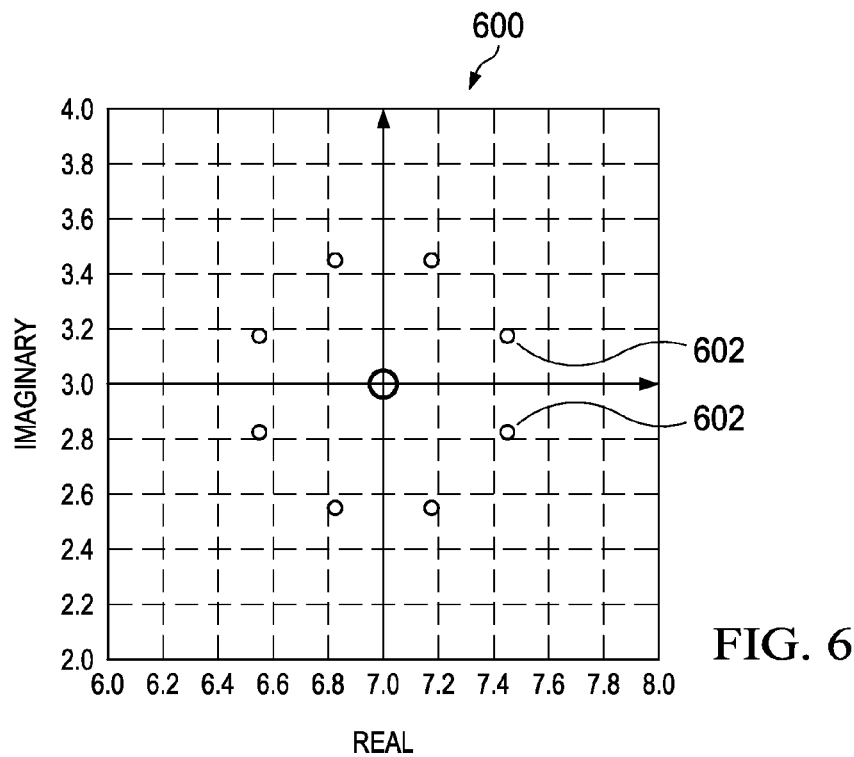
FIG. 6 shows an illustrative division of a primary constellation decision region into 8 quantization points of a 8-PSK secondary constellation in accordance with at least some preferred embodiments of the invention.
Figure 7:
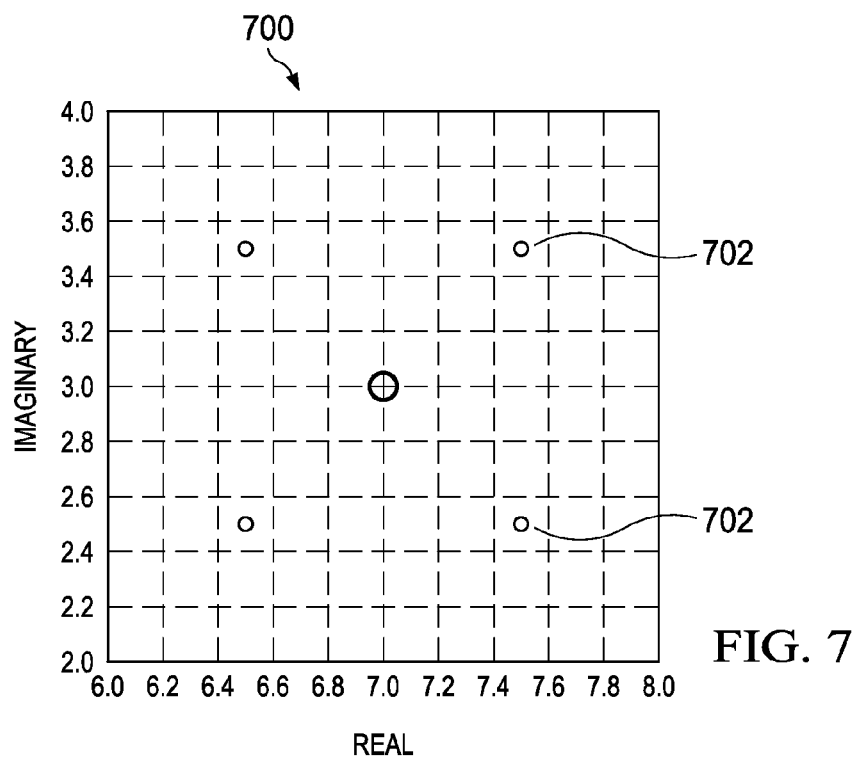
FIG. 7 shows an illustrative division of a primary constellation decision region into 4 quantization points of a 4-QAM secondary constellation in accordance with at least some preferred embodiments of the invention.
Figure 8:
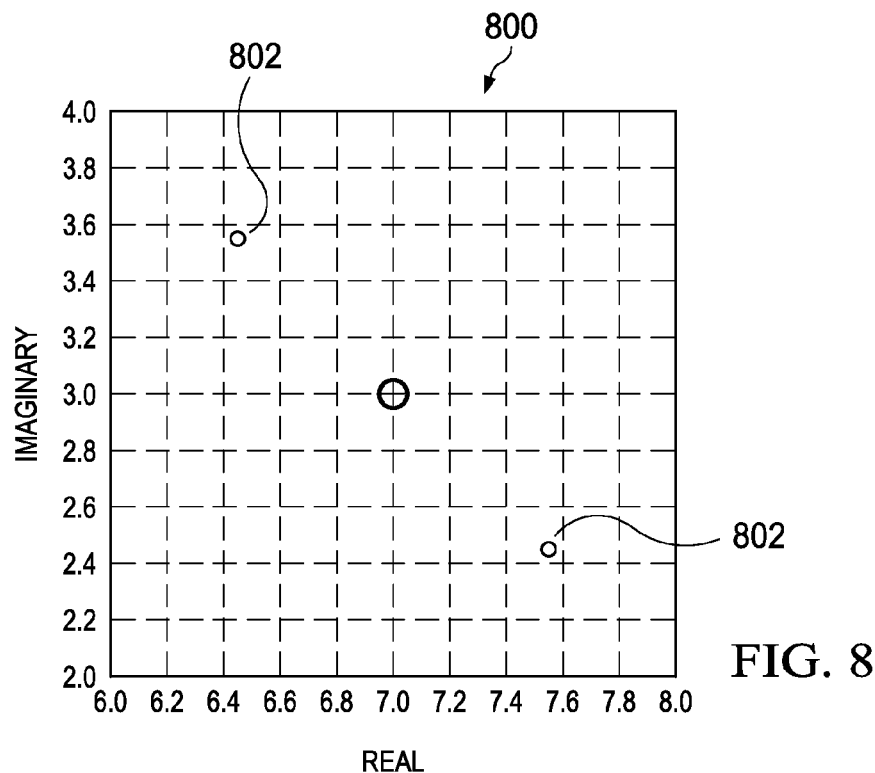
FIG. 8 shows an illustrative division of a primary constellation decision region into 2 quantization points of a BPSK secondary constellation in accordance with at least some preferred embodiments of the invention.

FIGS. 4-8 further illustrate the division of one decision region of a primary constellation A into the quantization points of a secondary constellation S in embodiments of the invention. FIG. 4 shows division of one decision region 400 in A, into 64 quantization points 402 (S=64-QAM). FIG. 5 shows division of one decision region 500 in A, into 16 quantization points 502 (S=16-QAM). FIG. 6 shows division of one decision region 600 in A, into 8 quantization points 602 (S=8-PSK). FIG. 7 shows division of one decision region 700 in A, into 4 quantization points 702 (S=4-QAM). FIG. 8 shows division of one decision region 800 in A, into 2 quantization points 802 (S=BPSK).

By using this technique to define the quantization set, embodiments of the invention allow the correct entry in the LUT to be found using two conventional slicing operations. A symbol slicer computes the element in A nearest y:

$$\hat{a}=\min_{x \in A}|y-x|.$$

Those of skill in the art will recognize that efficient slicer implementations exist for most symbol constellations, and that explanations of these slicers are outside the scope of the present disclosure. A slicer function that computes â and its index in the set A may be defined as:

$$[\hat{a},i_a]=\text{slicer}(y,A)$$

According to this notation, â is the $i_a$-th element in the set A. The elements in A may be indexed in any way, as long as each element has a unique index.

Embodiments of the invention perform three operations to quantize y and extract its sequence from a LUT. First, y is quantized to the primary constellation A using a slicer function; this provides â and $i_a$. Second, the input y is shifted before being sliced a second time to the secondary constellation:

$$[\hat{s},i_s]=\text{slicer}(y-\hat{a},S),$$

where S may be any properly scaled secondary constellation. For example, a QAM secondary constellation should be scaled by $\sqrt{|A|}$, i.e. $S=\{a_k/\sqrt{|A|} | \forall a \in A\}$. Finally, the k-th constellation sort output for the input y is extracted as $LUT(i_a, i_s, k)$.

Embodiments of the invention encompass many choices for a secondary constellation used to partition the decision regions of a primary (e.g. QAM) constellation. A smaller secondary constellation provides a smaller, less accurate candidate generation algorithm. Table 1 provides some exemplary secondary constellations.

TABLE 1

| Secondary constellation definitions | | |
|---|---|---|
| Secondary Constellation Label | Mathematical definition of S | n |
| Zero | S = 0 | |
| BPSK | S = {d · exp(jπ(¾ + n))} | n = 0, 1 |
| 4-PSK | S = {d · exp(jπn/2)} | n = 0, 1, 2, 3 |
| 4-QAM | S = {d · exp(jπ(½ + n)/2)} | n = 0, 1, 2, 3 |
| 8-PSK | S = {d · exp(jπn/8)} | n = 1, 3, 5, 7, 9, 11, 13, 15 |

The candidate generation LUT described above contains $|A| \cdot |S|$ entries. Many symbol constellations have symmetric properties that allow for lossless compression of the LUT. The present disclosure describes three properties of symmetry exhibited by a symbol constellation. Embodiments of the invention exploit these symmetries to reduce LUT size. For example, an embodiment exploiting these symmetries on a 64-QAM constellation may reduce the LUT size by more than a factor of eight.

The points in the first quadrant of a QAM constellation are simply rotated versions of the points in the other quadrants. Let $\hat{a}_n$ be an element of the constellation A that lies in the n-th quadrant, i.e. $(n-1)\pi/2 < \angle \hat{a}_n \pi/2$. Any symbol outside the first quadrant, can be mapped to a symbol inside the first quadrant by simply rotating the phase by a multiple of $\pi/2$:

$$\hat{a}_1 = \hat{a}_n e^{-j\frac{\pi}{2}(n-1)}.$$

The k-th element in the candidate symbol sequence for a particular point outside the first quadrant is simply a rotation of the k-th element in the candidate symbol sequence from the corresponding point inside the first quadrant. Mathematically, if the k-th nearest symbol to y is $\hat{a}_n$, then the k-th nearest symbol to $$y \cdot e^{-j\frac{\pi}{2}(n-1)}$$

is $$\hat{a}_n e^{-j\frac{\pi}{2}(n-1)}.$$

Figure 9:
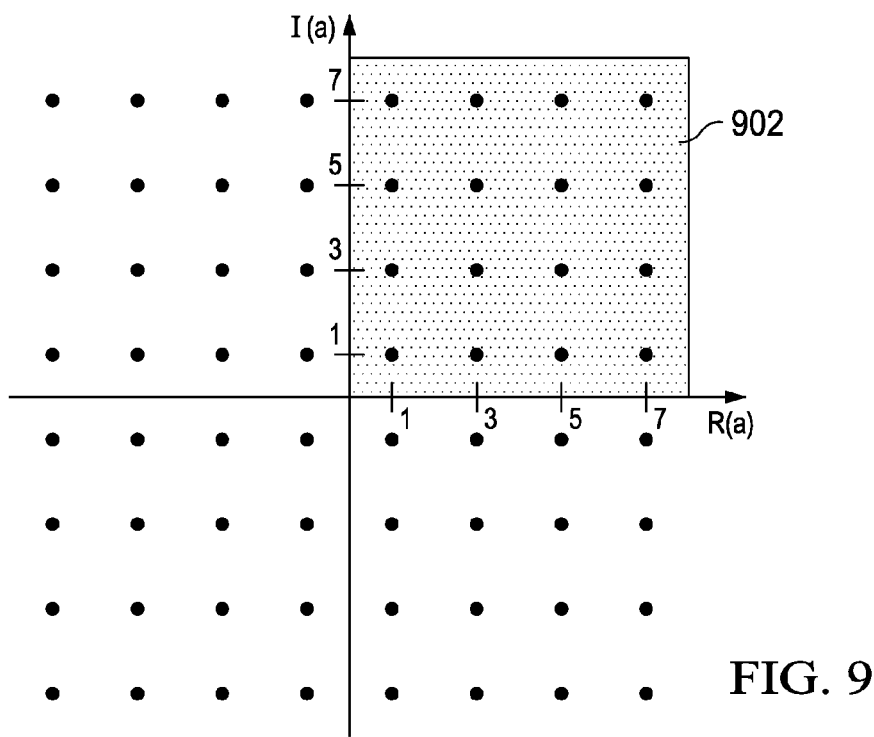
FIG. 9 shows an example of constellation quadrant symmetry in accordance with at least some preferred embodiments of the invention.

This symmetrical property (i.e. quadrant symmetry) allows the LUT size to be reduced by up to 75% because only the sequences associated with points in one of the quadrants needs to be stored. FIG. 9 shows an example of constellation quadrant symmetry illustrating up to a 75% reduction in LUT storage if the LUT contains only a single quadrant, for example, quadrant one 902.

The points in the constellation A may be divided by the diagonal along the line from the origin to $e^{-j\pi/4}$. The two partitions of A created by this diagonal line may be called the upper and lower partitions. The point y, belongs to the upper partition if $\pi/4 < \angle y < 5\pi/4$. Any point y in the lower partition, can be reflected across the diagonal to the point $j \cdot y^*$. Likewise, the sequence corresponding to the point y, can be reflected across the diagonal to obtain the sequence for the point $j \cdot y^*$. Note that $j \cdot y^* = \text{Im}(y) + j\text{Re}(y)$. This symmetry property may be termed mirror symmetry.

Figure 10:
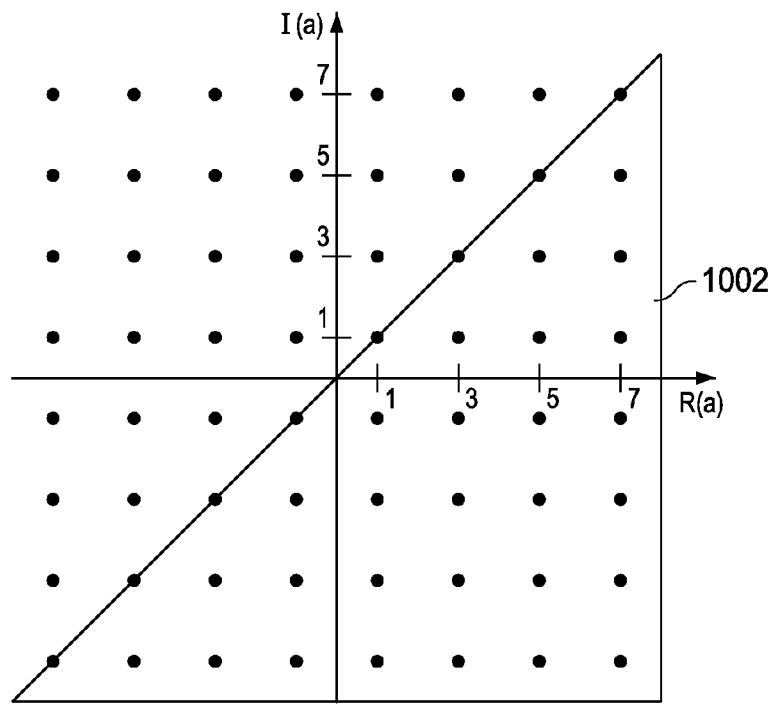
FIG. 10 shows an example of constellation mirror symmetry in accordance with at least some preferred embodiments of the invention.

Exploiting mirror symmetry alone reduces the number of sequences stored in the LUT by up to 50%. FIG. 10 shows an example of mirror symmetry illustrating the LUT storage reduction attainable if the LUT contains only points of the lower partition 1002.

Figure 11:
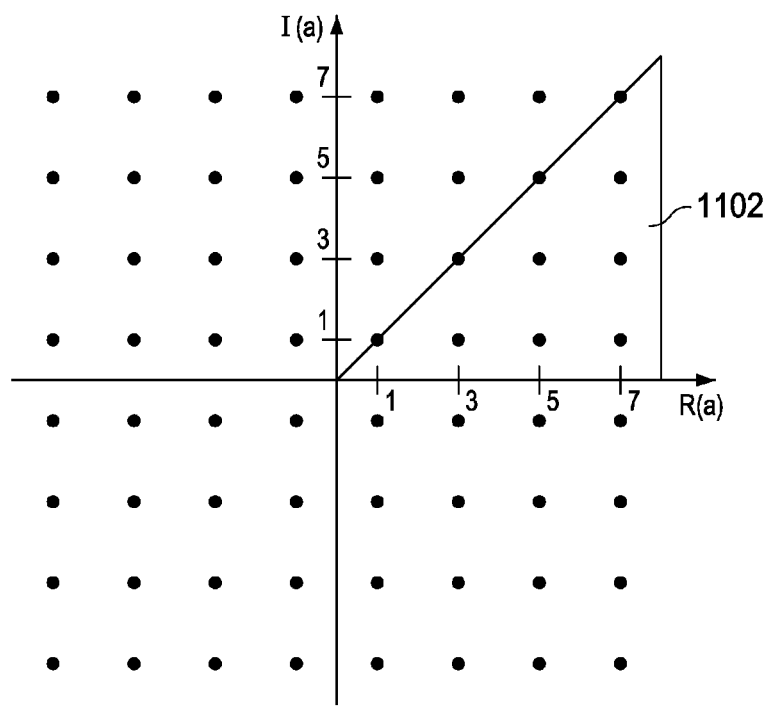
FIG. 11 shows an example of constellation quadrant symmetry in conjunction with constellation mirror symmetry in accordance with at least some preferred embodiments of the invention.

FIG. 11 shows an example of combining mirror and quadrant symmetry. By storing constellation points 1102, that is quadrant one points residing in the lower partition, LUT storage may be reduced by up to 87.5.

Figure 12:
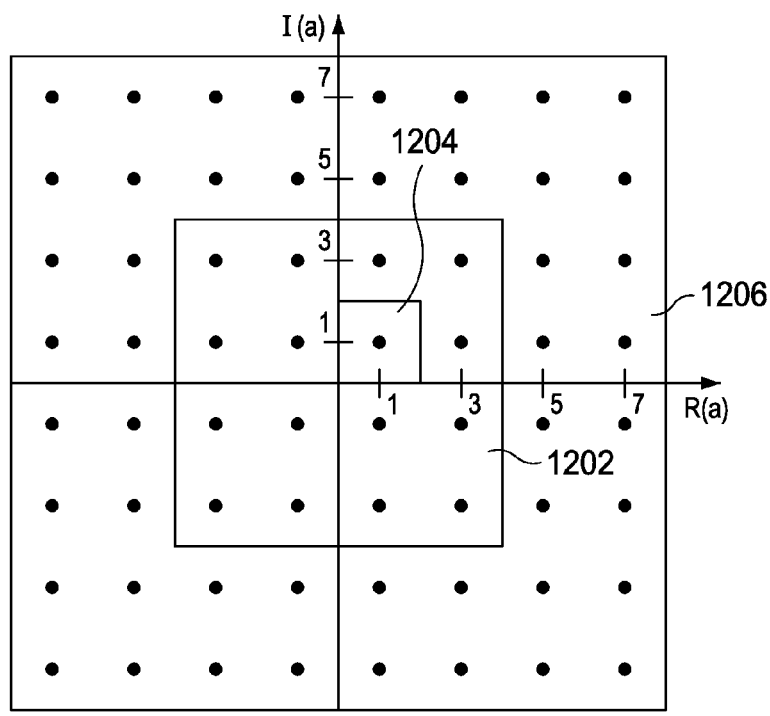
FIG. 12 shows an example of constellation inner-point symmetry in accordance with at least some preferred embodiments of the invention.

If the symbol alphabet A contains an infinite number of points, then the LUT need only store the candidate sequences corresponding to points in a single decision region. Depending on the candidate list length, the sequences for the inner points of A behave as is if A had an infinite number of points. The point y is called an inner point if its candidate sequence for a given constellation A is the same as its candidate sequence for an infinite constellation. Let â(k) be the k-th output of the candidate generation algorithm when y is input. Likewise, let d̂(k) be the k-th output of the candidate generation algorithm when y−â(1) is input. With these definitions the actual points are related to the differential points according to â(k)=d̂(k)+â(1). Therefore, to exploit inner point symmetry, embodiments of the LUT store the differential sequences {â(k)−â(1)} for only one of the inner decision regions instead of the sequences {â(k)} for every inner decision region. FIG. 12 demonstrates this concept. FIG. 12 assumes 16 inner points 1202. The LUT may contain only the inner point decision region 1204 and the outer point decision regions 1206, resulting in up to a 23.5% reduction in LUT storage.

Another advantage of storing the differential sequences rather than actual sequences is that differential sequences require fewer bits in some cases. Storing a differential sequence requires $\log_2(LL)$ bits, whereas storing an actual sequence requires $\log_2(|A|)$ bits.

Figure 13:
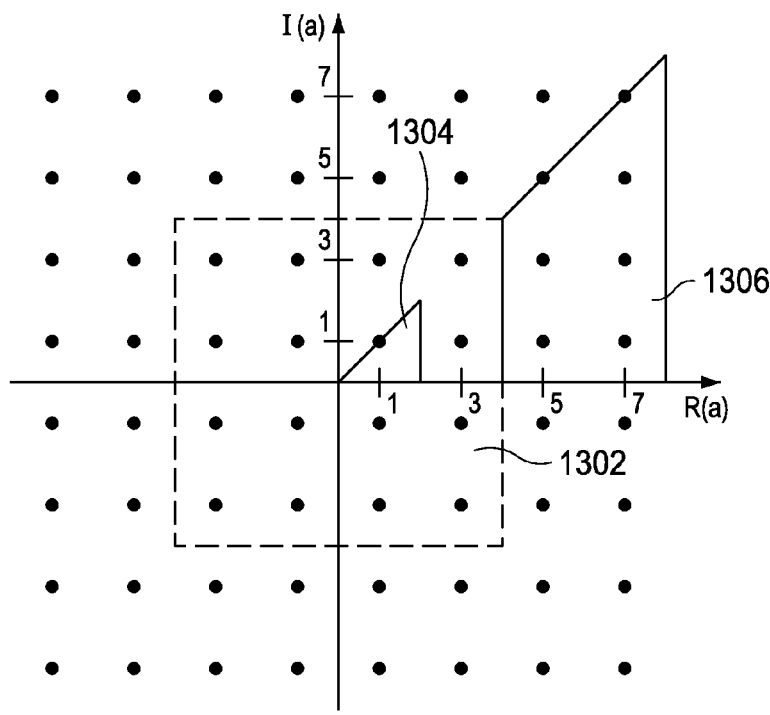
FIG. 13 shows an example constellation combining inner point symmetry and mirror symmetry applied to inner point decision region with quadrant and mirror symmetries applied to outer point decision regions in accordance with at least some preferred embodiments of the invention.

FIG. 13 shows an example constellation combining inner point symmetry and mirror symmetry applied to inner point decision region with quadrant and mirror symmetries applied to outer point decision regions. Sixteen inner points 1302 are assumed. Embodiments of the invention storing only the lower partition of the inner point 1304 and the one quadrant of outer points 1306 may reduce LUT storage by up to 89.8%.

Figure 14:
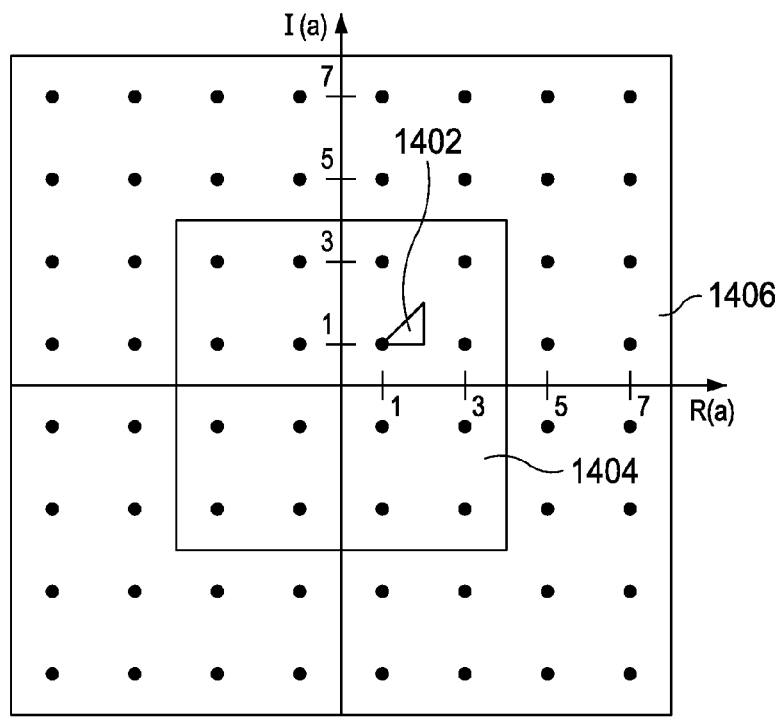
FIG. 14 shows an example of constellation inner point symmetry applied in conjunction with constellation quadrant symmetry and quadrant mirror symmetry to an inner point decision region in accordance with at least some preferred embodiments of the invention.

FIG. 14 shows an example constellation combining inner point symmetry with quadrant and mirror symmetry in an inner point decision region 1402. Sixteen inner points 1404 are assumed. In addition to inner point decision region 1402, embodiments of the invention store candidate sequences for outer point decision regions 1406 resulting in up to a 24.8% reduction in LUT storage.

Figure 15:
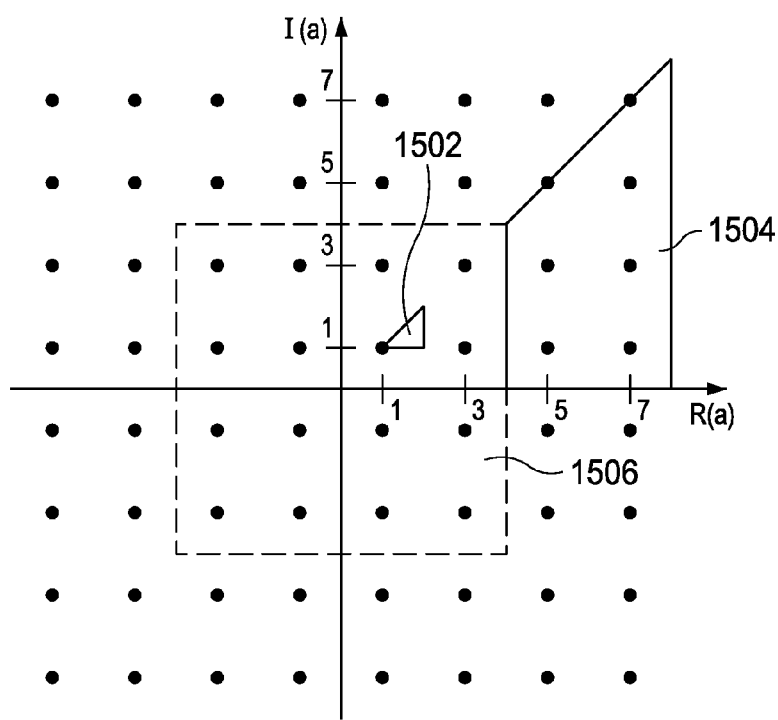
FIG. 15 shows an example of inner point, quadrant and mirror symmetries applied to inner and outer point decision regions of a constellation in accordance with at least some preferred embodiments of the invention.

FIG. 15 shows the application of quadrant and mirror symmetries to inner point decision region 1502 and to outer point decision regions 1504. Again, sixteen inner points 1506 are assumed. By combining inner point, quadrant, and mirror symmetries, embodiments of the invention may reduce LUT storage by up to 90.4% relative to storing an entire constellation. By applying inner point symmetry, embodiments of the invention achieve up to about 23% reduction is storage, relative to applying quadrant and mirror symmetry as shown in FIG. 11.

The LUT size reduction enabled by exploiting inner point symmetry depends on the number of inner points in the constellation A. Table 2 shows the number of inner decision regions in a 64-QAM constellation for different candidate list lengths.

TABLE 2

Number of inner points as a function of list length for 64-QAM.

| List Length | Number of Inner Decision Regions |
| --- | --- |
| 1 | 64 |
| 2-7 | 36 |
| 8-20 | 16 |
| 21-38 | 4 |
| 39-64 | 0 |

Embodiments of the invention apply the function s(y) to find a point's symmetrical match, that is, to rotate the point into the decision regions stored in the LUT. Similarly, the function $s^{-1}(\tilde{d},q,m)$ may be used to convert the symmetrical match back to its original place (i.e. to reverse the rotations of s(y)), where q is the quadrant index, and m is the mirroring flag. These functions are mutual inverses of each other, $[\tilde{d},q,m]=s(s^{-1}(\tilde{d},q,m))$. The realization of these functions depends on the types of symmetries exploited. The definitions for each case are given below, where $o \leq \theta < \pi/2$.

Quadrant Symmetry Only $$[\tilde{y}, q, m] = S\left(y = |y| \cdot e^{j\left(\frac{\pi}{2}(n-1)+\theta\right)}\right) = \left\{\tilde{y} = y \cdot e^{-j\frac{\pi}{2}(n-1)}, \quad q = n, m = 0\right.$$

$$\hat{a} = S^{-1}(\tilde{d}, q, m) = \tilde{d} \cdot e^{j\frac{\pi}{2}q}$$

Mirror Symmetry Only $$[\tilde{y}, q, m] = S(y) = \begin{cases} \tilde{y} = j \cdot y^*, & q = n, m = 1 \text{ if } \text{Re}(y) < \text{Im}(y) \\ \tilde{y} = y, & q = n, m = 0 \text{ otherwise} \end{cases}$$

$$\hat{a} = S^{-1}(\tilde{d}, q, m) = \begin{cases} j \cdot \tilde{d}^* & \text{if } m = 1 \\ \tilde{d} & \text{if } m = 0 \end{cases}$$

Quadrant and Mirror Symmetry $$[\tilde{y}, q, m] = S\left(y = |y| \cdot e^{j\left(\frac{\pi}{2}(n-1)+\theta\right)}\right)$$

$$= \begin{cases} \tilde{y} = j \cdot \left(y \cdot e^{-j\frac{\pi}{2}(n-1)}\right)^*, & q = n-1, \text{ if } \text{Re}\left(y \cdot e^{-j\frac{\pi}{2}(n-1)}\right) < \\ & m = 1 \quad \text{Im}\left(y \cdot e^{-j\frac{\pi}{2}(n-1)}\right) \\ \tilde{y} = y \cdot e^{-j\frac{\pi}{2}(n-1)}, & q = n-1, \text{ otherwise} \\ & m = 0 \end{cases}$$

-continued $$\hat{a} = S^{-1}(\tilde{d}, q, m)$$
$$= \begin{cases} \hat{a} = j \cdot (\tilde{d} \cdot e^{j\frac{\pi}{2}q})^* & \text{if } m = 1 \\ \hat{a} = \tilde{d} \cdot e^{j\frac{\pi}{2}q} & \text{if } m = 0 \end{cases}$$

Figure 16:
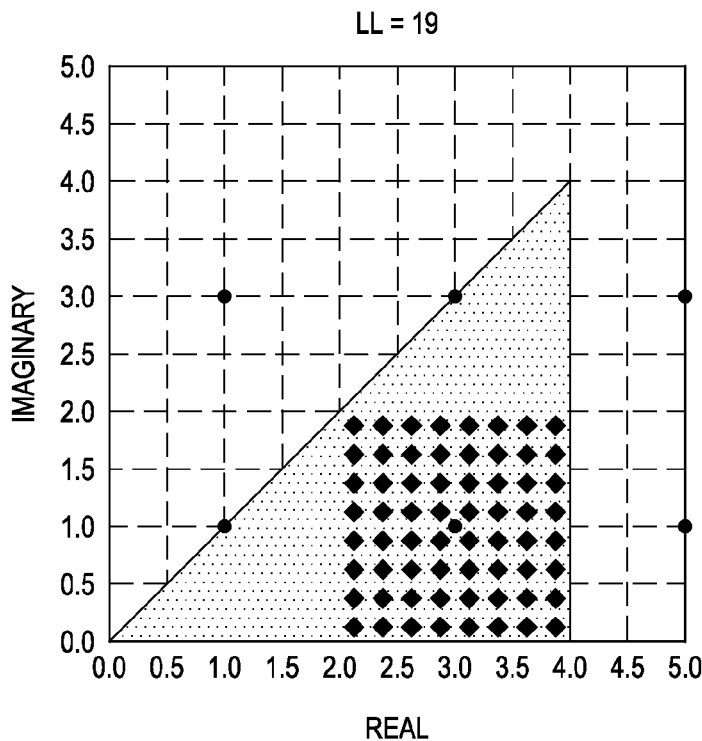
FIG. 16 shows illustrative inner points of a constellation when generating a 19 element candidate list in accordance with at least some preferred embodiments of the invention.
Figure 17:
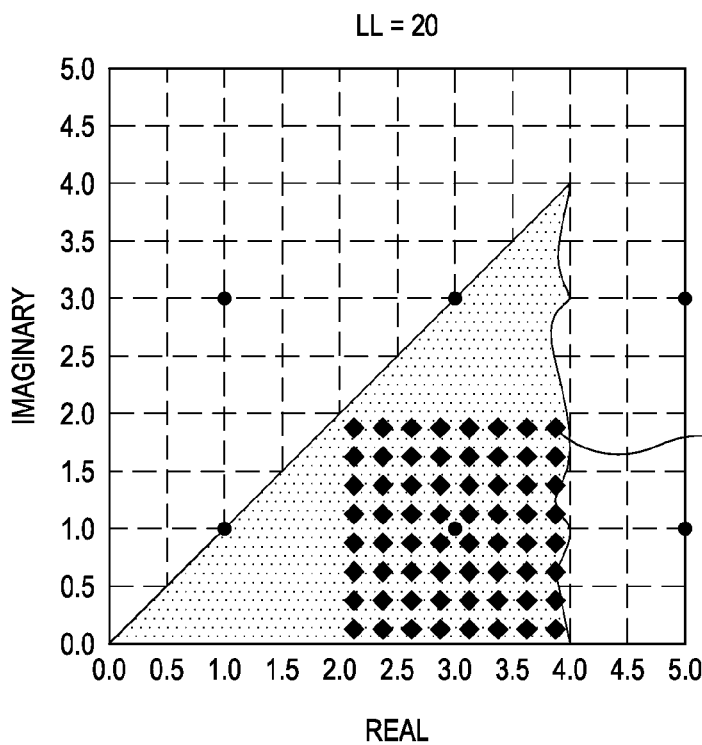
FIG. 17 shows illustrative inner points of a constellation when generating a 20 element candidate list in accordance with at least some preferred embodiments of the invention.
Figure 18:
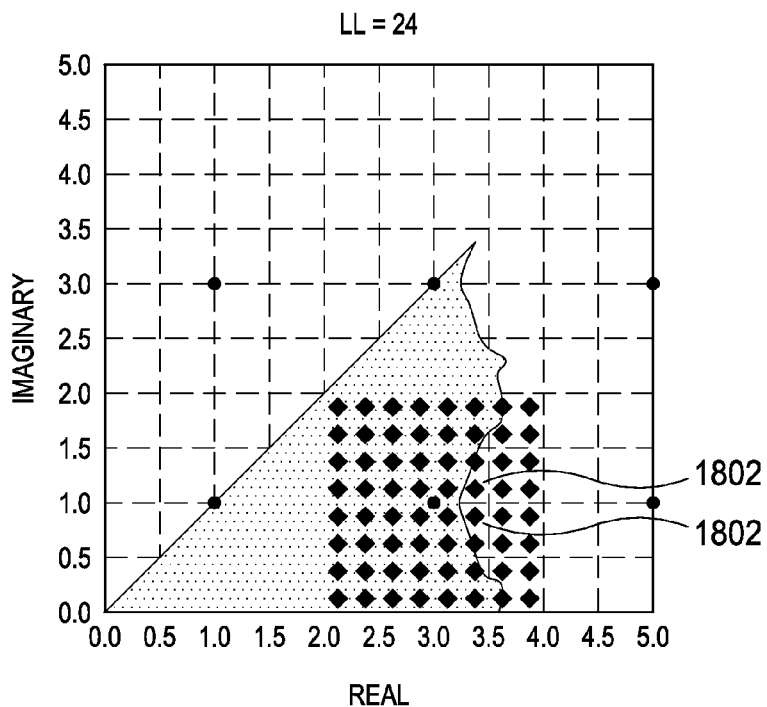
FIG. 18 shows illustrative inner points of a constellation when generating a 24 element candidate list in accordance with at least some preferred embodiments of the invention.

The LUT need store the candidate sequences for only a single inner point decision region. Which decision regions are actually inner decision regions depends on the candidate list length. Thus to build the LUT, as described above, points should be identified as belonging to an inner or outer decision region. A sequence for an input may be stored differently depending on whether the input belongs to the inner or outer region of the constellation. Only |S| total sequences need be stored for all inner decision regions, while |S| sequences are stored for each outer decision region. FIGS. 16, 17, and 18 show all inner points whose angles are greater than or equal to zero and less than or equal to $\pi/4$ for list lengths of 19, 20, and 24, respectively, when both quadrant and mirror symmetries are applied. As shown in FIG. 16, for a list length ("LL") of 19, the decision regions with Re(y)<4 are inner decision regions because they contain only inner points. Therefore, when LL=19, there are a total of 16 inner decision regions in the full 64-QAM constellation. On the other hand, when LL=20 and LL=24, the two outer decision regions contain some outer points. For LL=20 and LL=24, 96.8% and 72.4%, respectively, of the points in the decision region around 3+j are inner points. A secondary 64-QAM constellation is plotted around the point 3+j in each of FIGS. 16-18. As shown in FIG. 17, for LL=20, every point in the secondary constellation 1702 is an inner point, therefore, for LL=20 when S=64-QAM, there are 16 inner decision regions. However, as shown in FIG. 18, for LL=24, sixteen of the points 1802 in the secondary constellation are outer points. Thus, by identifying inner and outer points embodiments of the invention further simplify the LUT. Otherwise, decision regions whose secondary constellation contains outer points must be treated as outer decision regions to preserve lossless compression of the LUT. Table 3 lists the number of inner decision regions for various secondary constellations and candidate list lengths for a 64-QAM primary constellation.

Figure 20:
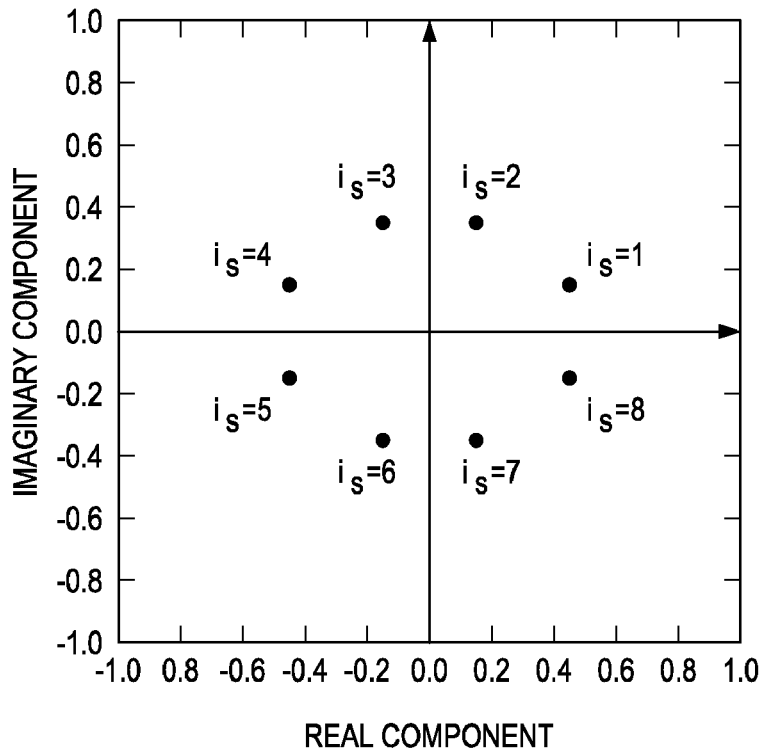
FIG. 20 shows an example of assigning indices to the elements of an 8-PSK secondary constellation in accordance with at least some preferred embodiments of the invention.

FIG. 20 shows an example of how indices may be assigned to the alphabet elements of an 8-PSK secondary constellation (S=8-PSK). All eight elements of the constellation are illustrated, and an index is assigned to each element.

Figure 21:
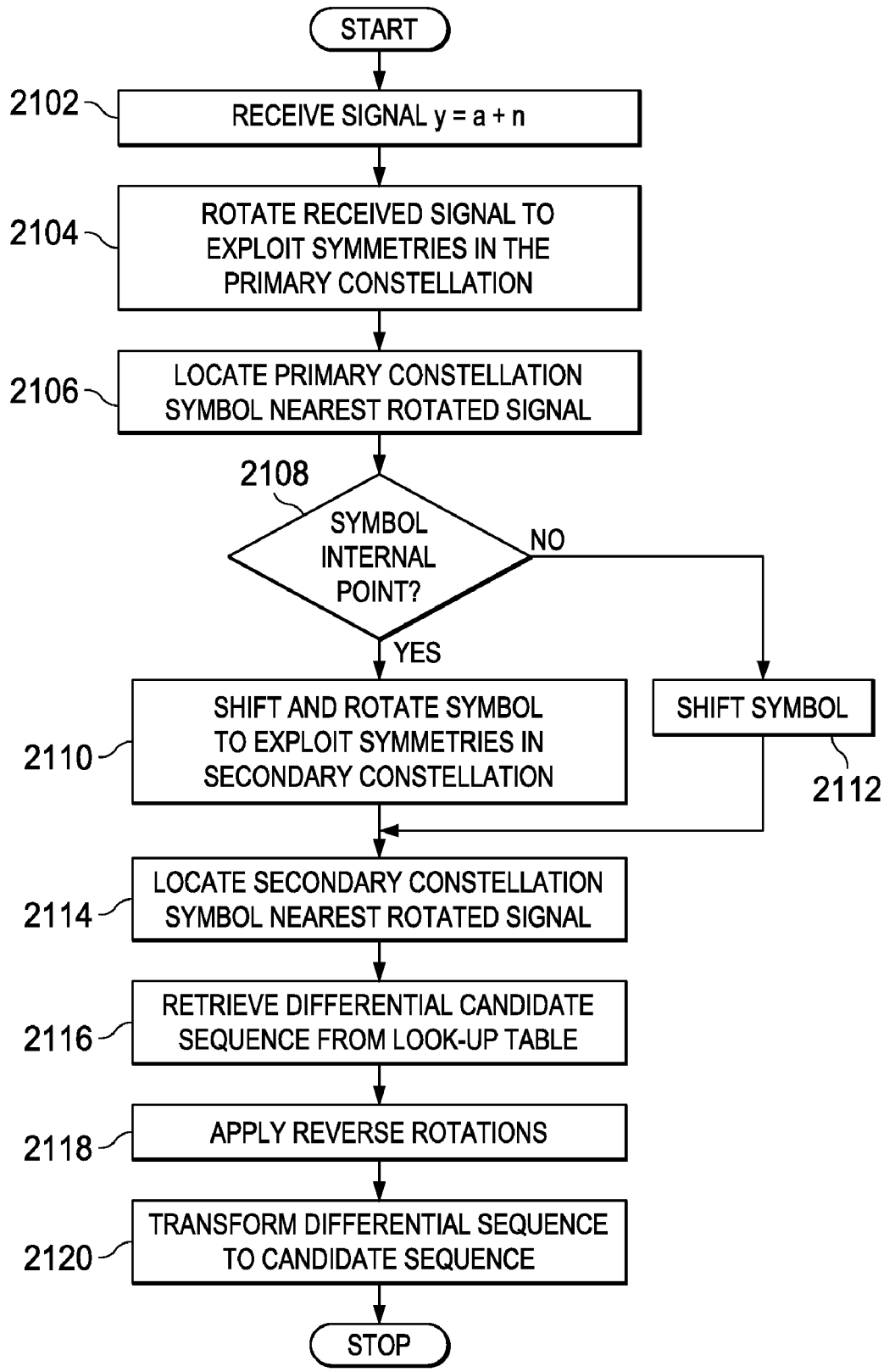
FIG. 21 shows a flow diagram for an illustrative method of generating a candidate list in accordance with at least some preferred embodiments of the invention.

FIG. 21 shows a flow diagram for an illustrative method of generating a candidate list in accordance with at least some preferred embodiments of the invention. The method depicted assumes that inner point, quadrant, and mirror symmetries are applied to the LUT. Though depicted sequentially as a matter of convenience, at least some of the actions shown can be performed in a different order and/or performed in parallel. In block 2102, a signal transmitted by a MIMO transmitter is received. The received signal comprises a symbol selected from an alphabet A and additive noise. The symmetries of the primary constellation are exploited, $[\tilde{y},q_a, m_a]=s(y)$, in block 2104, by rotating the received signal to a decision region stored in a candidate generation LUT as disclosed herein. The primary constellation symbol, and its index, located nearest the rotated signal are determined using slicer function $[\hat{a},i_a]=\text{slicer}(\tilde{y},A)$, in block 2106.

In block 2108, whether the rotated signal is an internal or external point in the primary constellation is determined. If the signal is an external point the signal is shifted, in block 2112, $\tilde{z}=\tilde{y}-\hat{a}$, and the secondary constellation quadrant and mirror flags are reset indicating no compression of the secondary constellation. If, however, the rotated signal is an internal point of the primary constellation, the symmetries applied to the secondary constellation are exploited, $[\tilde{z},q_s, m_s]= s\tilde{y}-\hat{a})$, by shifting and rotating the signal again into the stored portion of the inner point secondary constellation in block 2110.

The secondary constellation symbol, and its index, nearest the rotated signal are determined, in block 2114, using slicer function $[\hat{s},i_s]=\text{slicer}(\tilde{z},S)$, and the differential candidate sequence corresponding to the primary and secondary constellation indices is retrieved in block 2116.

In block 2118, reverse rotations are applied to the differential candidate sequence extracted from the LUT, $\hat{d}_k=S^{-1}(\tilde{d}_k, q_a+q_s,m_a \oplus m_s)$, to relocate the sequence to the received signal. The relocated differential sequence is transformed into a candidate symbol sequence, $\hat{a}_k=\hat{d}_k+\hat{a}$, in block 2120.

Figure 22:
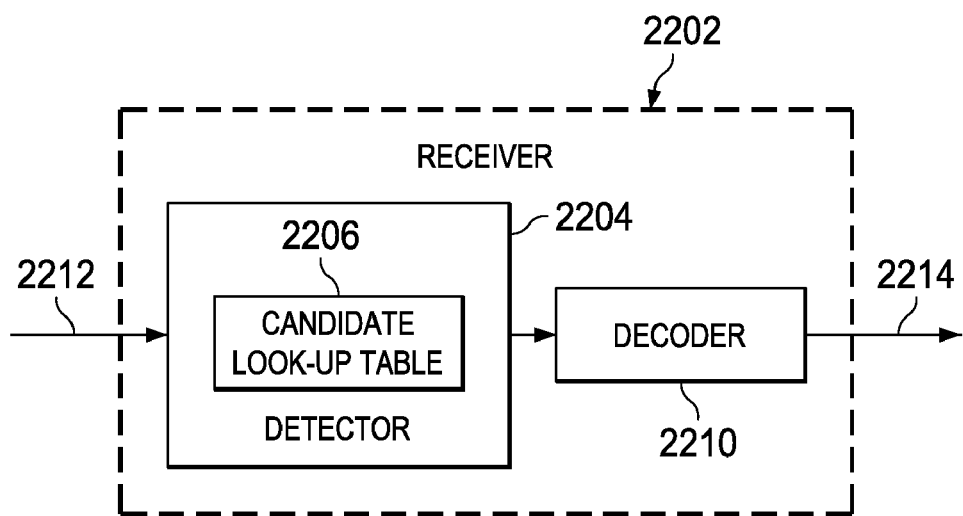
FIG. 22 shows an illustrative block diagram of a MIMO receiver that comprises a Candidate Look-Up Table ("LUT") in accordance with preferred embodiments of the invention.

FIG. 22 shows an illustrative block diagram of a MIMO receiver 2202 that comprises a Candidate Look-Up Table ("LUT") 2206 in accordance with preferred embodiments of

TABLE 3

Number of Inner Decision Regions for different secondary constellations.

| List Length (S = 64-QAM) | List Length (S = 16-QAM) | List Length (S = 4-QAM) | List Length (S = 8-PSK) | List Length (S = BPSK) | Number of Inner Decision Regions |
|---|---|---|---|---|---|
| 1 | 1 | 1 | 1 | 1 | 64 |
| 2-7 | 2-8 | 2-9 | 2-9 | 2-10 | 36 |
| N/A | N/A | 10 | N/A | N/A | 32 |
| 8-20 | 9-20 | 11-22 | 11-23 | 11-23 | 16 |
| N/A | 21 | 23 | N/A | N/A | 12 |
| 21-38 | 22-41 | 24-43 | 24-43 | 24-44 | 4 |
| 39-64 | 42-64 | 44-64 | 44-64 | 45-64 | 0 |

Figure 19:
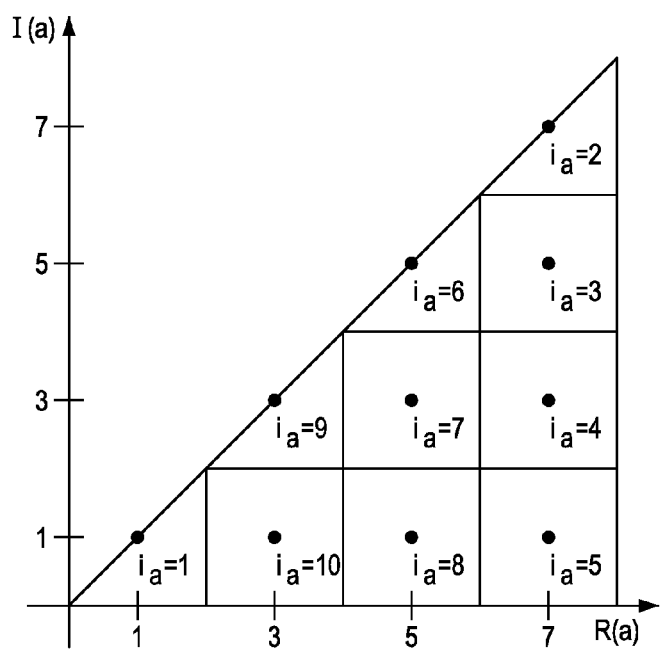
FIG. 19 shows an example of assigning indices to the elements of a 64-QAM primary constellation applying both quadrant and mirror symmetries in accordance with at least some preferred embodiments of the invention.

FIG. 19 shows an example of how indices may be assigned to the alphabet elements of a 64-QAM primary constellation (A=64-QAM). Because both quadrant and mirror symmetries are applied to the constellation, only the ten elements in the first quadrant on or below the diagonal are illustrated. As shown, an index value is assigned to each element.

the invention. A signal transmitted by a MIMO transmitter is detected by antennas 108 and provided to detector 2204 as received signal 2212. The transmitted signal comprises a symbol selected from an alphabet A. The received signal 2212 comprises the transmitted symbol plus additive noise. Detector 2204 includes a candidate look-up table 2206, as disclosed herein, to provide a list of candidate symbols for the transmitted symbol. The LUT 2206 preferably provides a secondary constellation superimposed over each point of a primary constellation. The LUT 2206 also preferably includes a single inner point of the primary constellation and outer points of the primary constellation (inner point symmetry). The primary and secondary constellations are preferably further compressed by application of quadrant and mirror symmetry as disclosed herein to reduce the size of the LUT.

The detector 2204 rotates the received signal 2212 into a detection region of the portions of the primary and secondary constellations stored in the LUT 2206. A sequence of differential values representing the candidate list is produced by the LUT 2206. Reverse rotations are applied to the differential sequence and the reverse rotated differential sequence is transformed into the list of candidate symbols.

The detector 2204 may use the list of candidate symbols to compute Log-Likelihood Ratios ("LLRs") indicating the probability that a bit was transmitted as a one or as a zero. The decoder 2210, coupled to the detector 2204, provides decoded data 2214 based on the LLRs generated by the detector 2204.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A system, comprising:
    a Multiple Input Multiple Output ("MIMO") receiver, the receiver comprising
        a candidate generation look-up table that provides a list of candidate values for a transmitted symbol selected from a constellation of symbols, the candidate generation look-up table stores candidate lists for a portion of the constellation of symbols, the portion selected according to a symmetry of the constellation of symbols,
    wherein the receiver performs a first slicing operation to determine the primary constellation symbol nearest a received signal and shifts the primary constellation symbol and performs a second slicing operation to determine the secondary constellation symbol nearest the received signal.

2. The system of claim 1, wherein the portion of the constellation of symbols is selected based on at least one symmetry selected from the group consisting of quadrant symmetry, mirror symmetry, and inner-point symmetry.

3. The system of claim 1, wherein the candidate generation look-up table stores a differential candidate list.

4. The system of claim 3, wherein the receiver transforms the differential candidate list into a candidate symbol sequence.

5. The system of claim 1, wherein the receiver rotates a received signal to position a rotated signal within the portion of a constellation stored in the candidate generation look-up table.

6. The system of claim 1, wherein the receiver retrieves a set of candidate values from the look-up table and rotates the set of candidate values to a portion of the constellation containing the received signal.

7. The system of claim 1, wherein the candidate generation look-up table comprises a secondary constellation within a decision region of a primary constellation.

8. The system of claim 1, wherein the MIMO receiver further comprises a wireless telecommunications device.

9. A system, comprising:
    a MIMO receiver that further comprises
        a candidate generation look-up table that provides a list of candidate values for a transmitted symbol selected from a constellation of symbols, the candidate generation look-up table comprising a secondary constellation within a decision region of a primary constellation,
    wherein the receiver performs a first slicing operation to determine the primary constellation symbol nearest a received signal and shifts the primary constellation symbol and performs a second slicing operation to determine the secondary constellation symbol nearest the received signal, said receiver.

10. The system of claim 9, wherein the secondary constellation is selected from a group consisting of a BPSK constellation, a 4-QAM constellation, an 8-PSK constellation, a 16-QAM constellation, and a 64-QAM constellation.

11. The system of claim 9, wherein the candidate generation look-up table stores candidate lists for a portion of the constellation, the portion selected based on at least one symmetry selected from the group consisting of quadrant symmetry, mirror symmetry, and inner-point symmetry.

12. The system of claim 9, wherein the MIMO receiver further comprises a wireless communications device.

13. A method for generating a candidate list, comprising:
    receiving a signal, the signal comprising a symbol selected from a constellation of symbols;
    performing a rotation of the signal to produce a rotated signal;
    retrieving a set of values from a candidate look-up table that contains candidate values for a portion of the constellation of symbols, the portion selected according to a symmetry of the constellation of symbols;
    determining whether the rotated signal is an internal or an external point of a primary constellation; and
    generating a list of candidate symbols corresponding to the signal based on the values retrieved from the look-up table.

14. The method of claim 13, further comprising performing a quadrant rotation of the received signal.

15. The method of claim 13, further comprising performing a mirror rotation of the received signal.

16. The method of claim 13, further comprising determining a symbol of the primary constellation nearest the rotated signal.

17. The method of claim 13, further comprising shifting the rotated signal and determining a symbol of a secondary constellation nearest the shifted rotated signal.

18. A method for generating a candidate list, comprising:
    receiving a signal, the signal comprising a symbol selected from a constellation of symbols;
    performing a rotation of the signal to produce a rotated signal;
    retrieving a set of values from a candidate look-up table that contains candidate values for a portion of the constellation of symbols, the portion selected according to a symmetry of the constellation of symbols;
    generating a list of candidate symbols corresponding to the signal based on the values retrieved from the look-up table;

performing a reverse rotation of the set of values retrieved from the candidate look-up table, the reverse rotation reversing the rotation of the signal.

19. A method for generating a candidate list, comprising:

receiving a signal, the signal comprising a symbol selected from a constellation of symbols;

performing a rotation of the signal to produce a rotated signal;

retrieving a set of values from a candidate look-up table that contains candidate values for a portion of the constellation of symbols, the portion selected according to a symmetry of the constellation of symbols;

generating a list of candidate symbols corresponding to the signal based on the values retrieved from the look-up table;

transforming the set of values retrieved from the candidate look-up table, the set of values being a differential sequence, to produce the list of candidate symbols.

* * * * *